United States Patent [19]
Heyraud

[11] Patent Number: 6,024,482
[45] Date of Patent: Feb. 15, 2000

[54] DEVICE FOR TRANSFERRING AND MIXING PULVERULENT PRODUCTS

[75] Inventor: Jacques Heyraud, Veneues, France

[73] Assignee: Compagnie Generale Des Matieres Nucleaires, Velizy-Villacoublay, France

[21] Appl. No.: 08/921,999

[22] PCT Filed: Jan. 2, 1997

[86] PCT No.: PCT/FR97/00003

§ 371 Date: Apr. 9, 1998

§ 102(e) Date: Apr. 9, 1998

[87] PCT Pub. No.: WO97/25267

PCT Pub. Date: Jul. 17, 1997

[30] Foreign Application Priority Data

Jan. 3, 1996 [FR] France .................................. 96 00026

[51] Int. Cl.[7] ............................ B01F 11/00; B65G 65/23; B65G 65/34
[52] U.S. Cl. ........................................... 366/216; 366/185
[58] Field of Search .......................... 366/108, 110–114, 366/185, 184, 208–211, 213–216, 218–219, 249

[56] References Cited

U.S. PATENT DOCUMENTS 2,487,033  11/1949  Thurman et al. ....................... 366/218
4,208,135  6/1980  Bastiao .................................... 366/219
4,450,983  5/1984  Goodrich ................................ 366/108
4,569,623  2/1986  Goldmann .
5,302,073  4/1994  Riemersma et al. .

FOREIGN PATENT DOCUMENTS 2540472   2/1983   France .
2617817   7/1987   France .
  85222  12/1920   Germany ................................ 366/218

Primary Examiner—Charles E. Cooley
Attorney, Agent, or Firm—Pearne, Gordon, McCoy & Granger LLP

[57] ABSTRACT

A machine (3) provided with an elevator chassis (8), a body (12) swinging round a vertical axis and extended on two opposite sides by a distribution chute (16) and by a plate (11) adapted to grasp a powder-filled jar (1). The plate (11) can rotate in order to bring about the mixing of the powder in the jar, as well as during the emptying phase in order to improve the efficiency thereof. The body (12) swings in order to invert the jar and allow its content to escape by the chute (16). It is thus possible to transfer the powder from one transportation path (2) to another (20) in a purely automatic manner and without any hazard if the powder is dangerous or toxic.

10 Claims, 4 Drawing Sheets

DEVICE FOR TRANSFERRING AND MIXING PULVERULENT PRODUCTS

BACKGROUND OF THE INVENTION

1. Field of the Invention

The invention relates to a device for the transfer and mixing of pulverulent products, firstly contained in jars located at a first location, towards a second location, which can be a raised transporting path.

2. Description of Related Art

Certain products are handled in tight enclosures such as e.g. glove boxes, so that they are difficult to transport. The invention is used in circumstances of this nature. It is necessary to design a machine making it possible to grasp the jars and transport them in front of the second location before emptying them into it. It is necessary for the operation to be perfectly reliable and for it to be accompanied by no dispersion of the jar content, which may be toxic or dangerous, which also justifies the use of a completely automatic transfer process. It has been that the pulverulent products contained in the jars are often inadequately mixed, so that it is necessary to carry out such a mixing operation with the machine prior to emptying into the second location.

U.S. Pat. 4,569,623 and French Patent 2,617,817 describe more rudimentary devices, which are suitable neither for the automation of the transfer (the jars having to be fixed manually), nor for the preliminary mixing of the powder, nor for broad transfer possibilities, because the device has a fixed part linked with an emptying path and has no valve by means of which the jar can be retained and confined in the machine during the displacement of the body towards the emptying path.

SUMMARY OF THE INVENTION

These problems are solved with the present invention which, in its most general form, relates to a device for the transfer and mixing of pulverulent products contained in jars comprising a body installed so as to swing or tilt about a horizontal axis under the impulsion of a first motor, a plate and a distribution chute installed at two opposite ends of the body, which is traversed by a recess extending from one of its ends to the other and the plate being traversed by a recess extending from one face positioned in front of the body to a fixing device with a face carrying the grasping grips of a jar neck, said recesses being in extension, a second motor rotating the plate about an axis aligned with the plate recess, a valve making it possible to open and close the recess, the body being able to swing between a position where the plate is located beneath the body and a position where the chute is inclined downwards from the body.

This device makes it possible to transfer the pulverulent product between two locations relatively remote or displaced from one another. The body can be installed on an elevator chassis in order to compensate the level difference between the two locations, or lower the body of the device onto the jar which has been grasped. The function of the valve is not to authorize a flow out of the jar prior to mixing and the end of tilting of the body.

According to the device of the present invention, the emptying is facilitated if the chute is installed on the body by means of a vibrator system.

According to an advantageous embodiment of the invention, the grips are installed on pivots connected to a ring rotating in the plate under the effect of a third motor by rollers and cams making it possible to swing the grips between a retracted position and a convergence position, where the jar neck is retained, and between a lowered position coinciding with the retracted position and a locking position coinciding with the convergence position where the jar neck is raised and pressed against the plate around the recess. This mechanism permits an automatic stowing and unstowing of the jars.

BRIEF DESCRIPTION OF THE DRAWINGS

The invention is described in greater detail hereinafter relative to the attached drawings, wherein show.

DESCRIPTION OF THE PREFERRED EMBODIMENTS

Figure 1:
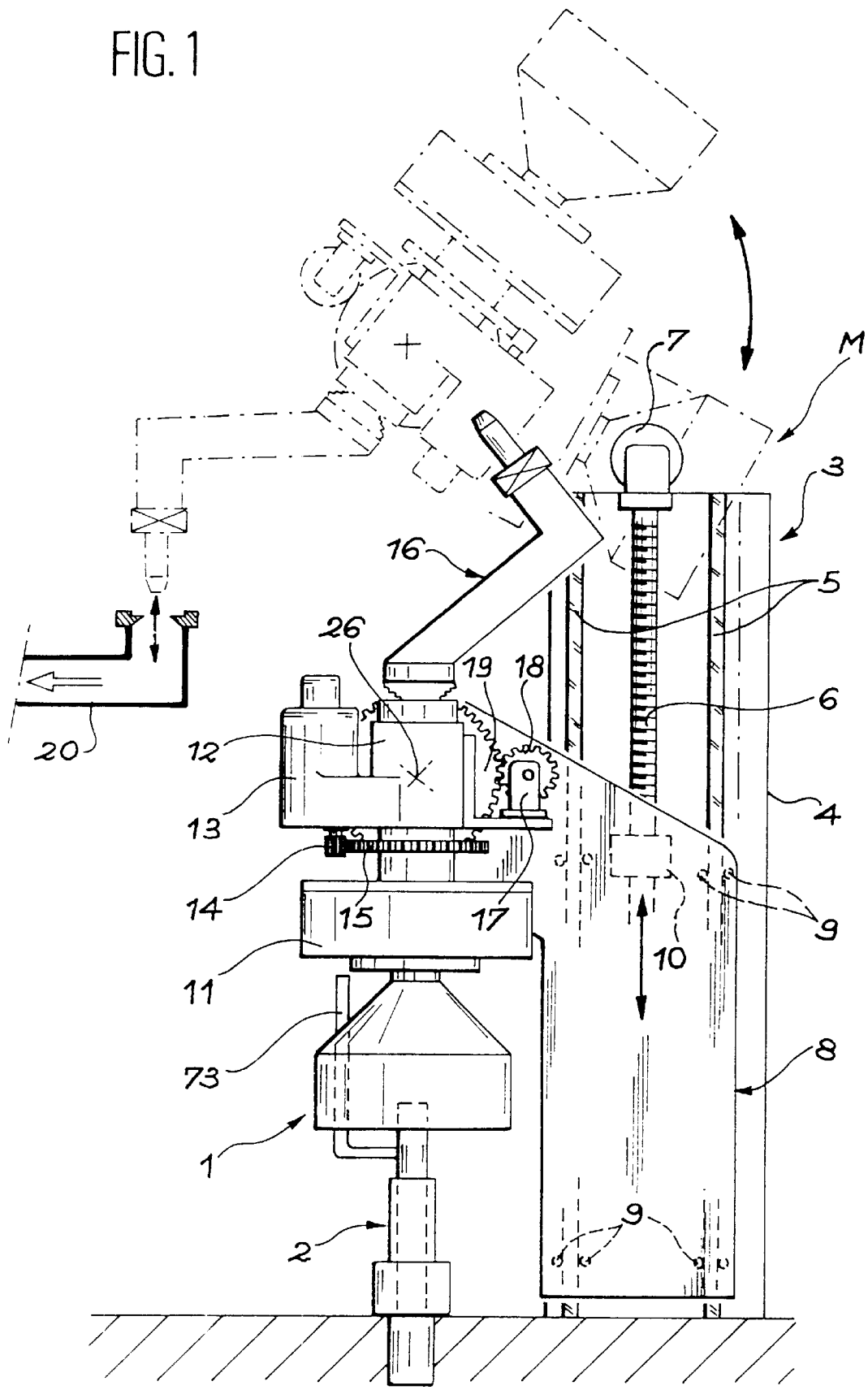
FIG. 1 A general view of the machine.

Jars 1 carrying possibly toxic or dangerous powders are carried on a first transportation path 2 passing in front of the machine 3 according to the invention. The first transportation path 2 can be formed by a continuous belt conveyor or by some other means. In this case it is a jack on which the jars 1 are successively applied and raised. The machine 3 comprises a frame 4 fixed to the ground and carrying vertical slides 5 and a vertical Archimedes' screw 6 rotated by a motor 7. This system raises or lowers a chassis 8 equipped with two pairs of rollers 9, which bear on slides 5 and slide thereon and a nut 10 engaged in the Archimedes' screw 6. As this type of system is well known, it is not represented in greater detail here. When the chassis 8 is lowered, the jar 1 can be grasped by the lower portion of the machine part carried by the chassis 8 and constituting a plate 11 to be described hereinafter. This plate is mounted on a main body 12 of the machine by means of a motor 13 fixed to said body 12 and whose pinion 14 drives a wheel 15 integral with the plate 11 in order to make it rotate about an axis vertical in the present case. The plate 11 is located beneath the body 12 and a chute 16 is fixed to said body 12. Another motor 17 fixed to the chassis 8 and whose pinion 18 meshes with a wheel 19 integral with the body 12 makes it possible to swing the latter and consequently the plate 11 and chute 16 about a horizontal axis.

FIG. 1 shows that tilting or swinging takes place when the chassis 8 has been raised. The swinging angle is approximately 150°, which places the jar 1 with a considerable inclination above the plate 11 and enables its content to flow out through said plate 11 and body 12 into the chute 16, which is then inclined downwards from the body 12. The content of jar 1 then traverses the machine and then the chute 16 to enter a second transportation path 20, along which it is discharged. There is an intermediate position, shown in mixed line form, where the jar 1 is inclined without being inverted. This position carries the reference M and corresponds to the mixing of the content of the jar 1, when the plate 11 rotates. Jar 1 is internally provided with helical or vertical, internal fins making it possible to raise powder masses before allowing them to drop again, which creates the desired mixing.

Figure 2:
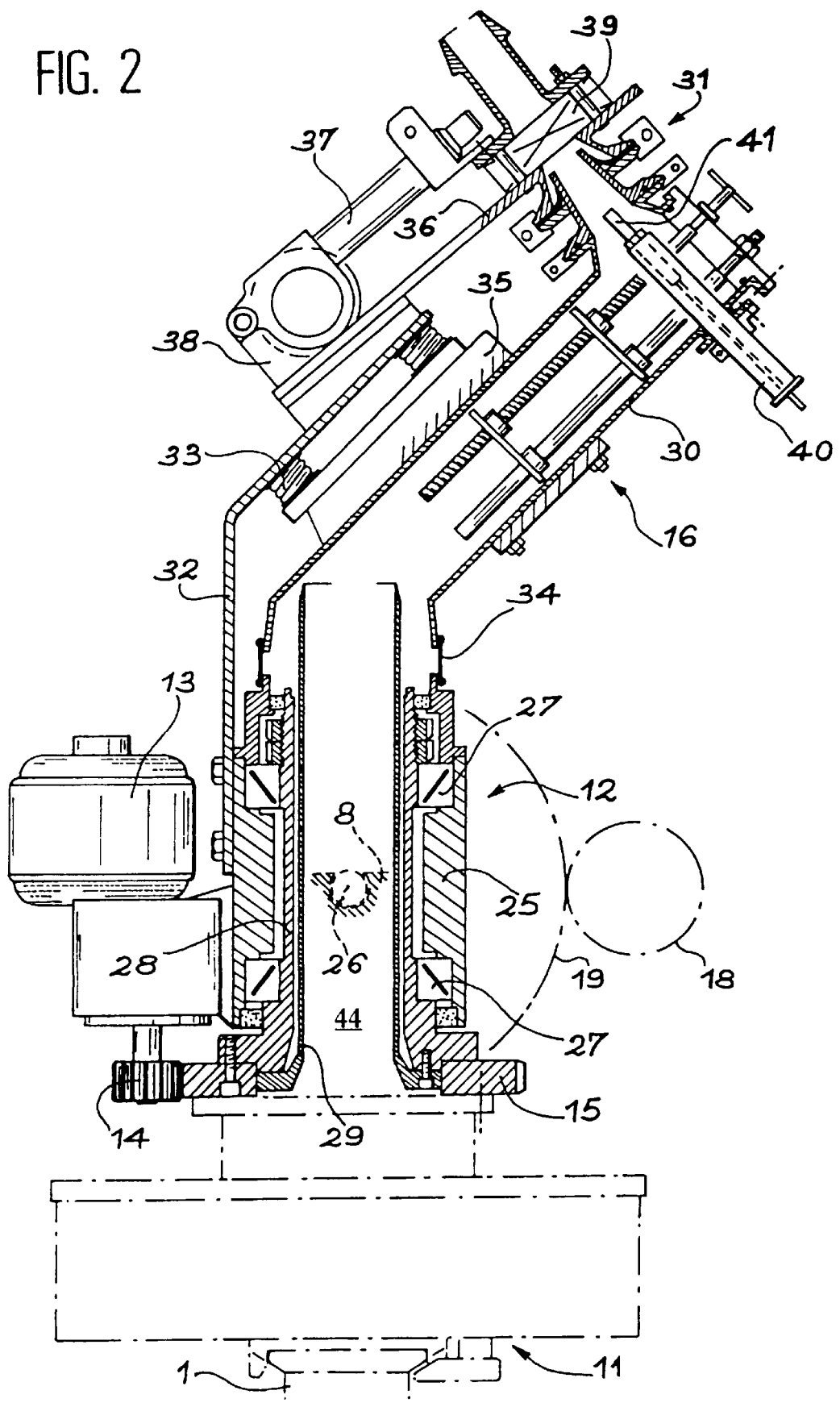
FIG. 2 A view of the central body and chute.

Following this operation of the machine 3, it returns to its initial position in order to set down the jar 1 and grasp another jar after the empty jar 1 has been removed. The more significant components of the machine 3 will now be described. As can be seen in FIG. 2, the body 12 comprises a cylindrical, external shaft or barrel 25, from which extend shaft ends 26 in extension supported in bearing blocks of the chassis 8. The outer shaft 25 carries bearings 27 for the supporting of an internal shaft or barrel 28 integral with the plate 11. The plate 11 also carries a tube 29 contained in internal 28 and external 25 shafts and which completely traverses them in order to lead to the inlet of the chute 16. The latter firstly comprises a cylindrical tube 30 passing obliquely upwards into the starting position and passing horizontally into the emptying position, which is terminated by an opening 31 at right angles therewith and directed towards the bottom in the emptying position. The tube 30 is placed on a lug 32 fixed to the outer shaft 25 by means of springs 33. The lower end of the tube 30 is connected to the top of the shaft 25 by an elastic sleeve 34, which maintains the sealing action at this point. The assembly 35 connecting the tube 30 to the spring 33 is extended beyond the lug 32 and is terminated in a strip 36 fixed to the opening 31 and carrying a jack 37 and a vibrator 38. The jack 37 controls the opening of a butterfly valve 39 positioned across the opening 31. After opening the butterfly valve 39, the vibrator 38 is started up in the emptying position in order to impart vibrations to the complete chute 16 enabling the powder to advance along the tube 30 towards the opening 31. Jar emptying is improved by making it rotate at a reduced speed of e.g. 1 r.p.m. by the actuation of the motor 13. A jamming sensor 40 is provided with its sensitive element 41 at the inlet of the opening 31 and is used to detect any powder flow abnormality. It then acts on the jar rotation and vibrator vibration controls in order to stop the operation thereof. The plate 11 continues to rotate during emptying in order to facilitate the latter.

Figure 3:
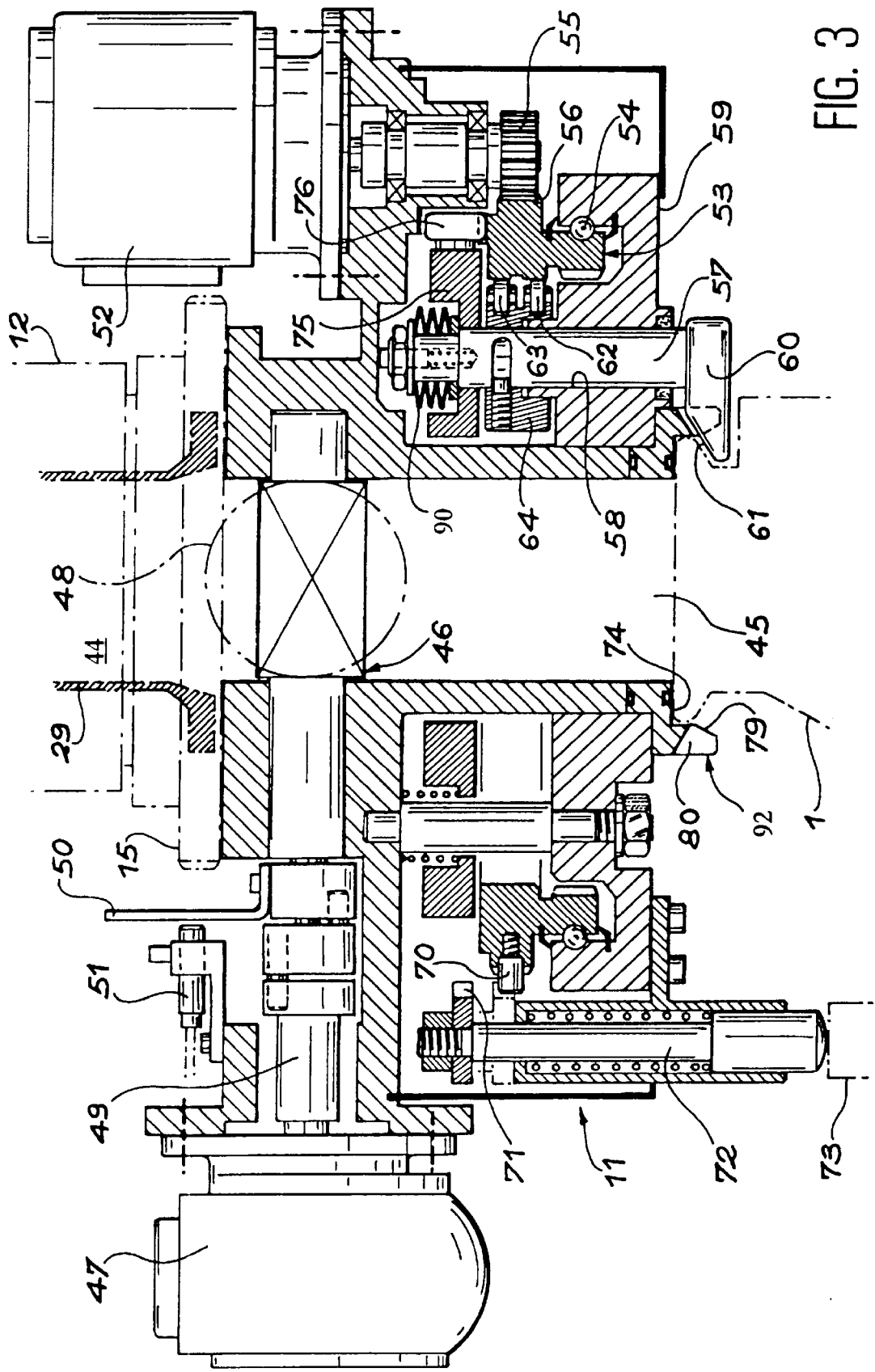
FIG. 3 A diametral section of the plate.

Reference should now be made to FIG. 3 more particularly showing the plate 11. It is firstly possible to see the central, vertical recess 45 in the extension of the recess 44 of the outer shaft 25. a second butterfly valve 46 crosses this recess 45 under the toothed wheel 15. Another motor 47 controls the valve 46 by rotating the butterfly 48 and a motor shaft 49 controls the rotation of a pin 50 in front of detectors 51, whereof only one is shown, so as to indicate that by the detection of the presence of the pin 50 in front of them whether the butterfly 48 is open, closed or in an intermediate state.

A further motor 52 is installed on plate 11 and controls the rotation of a ring 53 mounted horizontally in a lower portion of the plate 11 by means of a ball bearing 54. The pinion 55 of motor 52 meshes with a toothed periphery 56 of said ring 53.

The motor 52 and ring 53 are responsible for the displacement of pivots 57 engaged across apertures 58 of the plate 11 and whose lower end, passing beyond the lower face 59 of the plate, carries four grips 60 (only one being shown in the drawing), respectively intended to be introduced beneath the neck 61 of the jar 1 and retain it against the machine 3. The grips 60 are horizontal catches positioned in eccentric or offset manner on pivots 57 and it is merely necessary to rotate same by a portion of a revolution in order to place them either in the convergence position or grasping position of the jar 1, in which they are directed towards one another, or into a retracted position corresponding to the release of the jar 1. This movement is controlled for each grip 60 by two superimposed rollers 62, 63 installed in a washer 64 fixed to the pivot 57 and which roll along two horizontal, circular cams 65 and 66, which are superimposed and better visible in FIG. 4. The lower cam 65 has lower projections 67 with an angular extension of about 10°, one per pivot 57, whereas the upper cam 66 has other circular arc, wider projections 68 with an angular extension of about 60°, each covering a portion of the lower projection 67.

Figure 4:
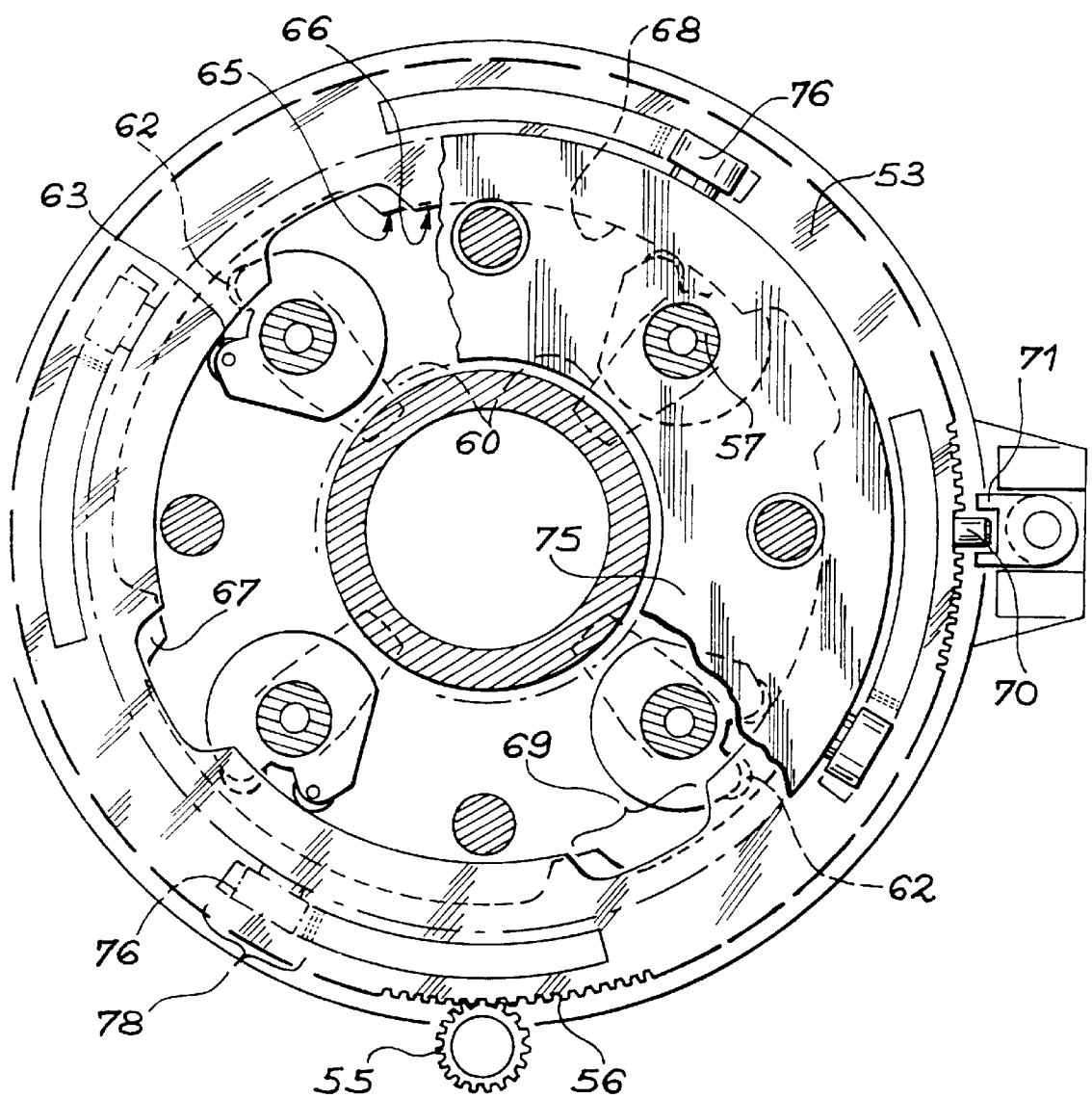
FIG. 4 A view in the axis of the plate of the jar grasping grip control mechanism.

The state shown in FIG. 4 corresponds to the convergence or securing position by the grips 60. On wishing to obtain the release position, it is necessary to turn the ring 53 in a clockwise direction by about 60°. The lower projection 67 will soon reach the lower rollers 62 and will push them back, which gives rise to the rotation of pivots 57. Just prior to this the upper projection 68 would be hidden beneath the lower rollers 62, which could therefore pass to the bottom of gaps 69 of the upper cam 66 located between the upper projections 68. The lower rollers 62 and lower cams 65 are used for controlling the rotation of the pivots 57, whereas the upper rollers 63 and upper cam 66 and more specifically the projections 68 thereof, are used for maintaining the grips 60 in the convergence position and for thus preventing an accidental release of the jars 1. The ring 53 is also provided with a pin 70 interrupting its tooth system. At the end of rotation, it arrives in front of a fork 71, which slides vertically in front of it, because it is fixed to the end of a sliding rod 72, whose lower end projects beneath the plate 11. This end is forced back by an element 73 of the first transportation path 2 when the jar 1 is raised towards the machine 3. The rod 72 and fork 71 are then also raised, which frees the pin 70 and permits the rotation of the ring 53 during this period, which corresponds to the immobilization of the jar on the machine 3 or conversely to its release. The plate 11 is raised, the fork 71 drops on the pin 70, immobilizes it and prevents the displacement by inattentiveness or accident of the ring 53. Thus, the grips 60 remain in the convergence position.

It is pointed out that in the position of FIG. 3 illustrating a convergence start position with respect to the grip 60, the latter are still not in contact with the jar neck 61, i.e. they cannot be maintained against the lower edge 74 of the recess 45, which is indispensable for opposing powder leaks during emptying. This is why the previously described mechanism must be completed. The pivots 57 are carried by a disk 75 placed above the ring 53 and carrying the rollers 76 rolling thereon. As can be seen in FIG. 4, the rollers 76 roll on circular arc cam surfaces 77 located at the apex of the ring 53 and which have a clockwise direction-increasing height in order to finish in an end plate 78 corresponding to an extreme elevation of the disk 75, obtained at the end of travel of the grips 60 and which gives the desired securing of the jar 1 by the grips 60. In this extreme position, the grips, raised with respect to the state of FIG. 3, raise the jar neck 61 and press it beneath the recess edge 74. A certain elasticity is offered by the springs 90 by which the pivots 57 are suspended on the disk 75 and which make it possible to regulate the locking force of the jar neck 61.

The rotation stoppage of the grips 60 can be controlled by studs 92 surrounding like them the recess 45 and whereof an essential function is to permit the centering of the jars 1 by means of conical, inner surfaces 79 against which rubs the jar neck 61. The grips 60 abut against the lateral faces 80 of said studs 92.

The process can be significantly automated with the aid of not shown detectors, identical to detector 51 given in the description as an example thereof. Such detectors can be positioned so as to check the presence of a jar 1 beneath the lower surface 59, or to follow the rotation of the ring 53 or the swinging of the body 12. The correct performance of the powder transfer is then checked at all times and operations are only continued if no abnormality is detected. In particular, the opening of the valve 46 can be dependent on this condition.

The invention can be used in the nuclear or pharmaceutical industries, where samples have to be transported into tight installations. It then makes it possible to carry out manipulations which are difficult from the outside and facilitates the task of operators.

I claim:

1. Device for the transfer and mixing of pulverulent products contained in jars (1), comprising a body (12) installed so as to swing about a horizontal axis (26) under the impulsion of a first motor (17), a plate (11) and a distribution chute (16) being installed at two opposite ends of the body (12), wherein said body can swing between a position where the plate is located beneath the body and a position where the chute extends beneath the body (12) and the jar (1), characterized in that the body is traversed by a recess (44) extending from one end of the body to the opposite end of the body and the plate is traversed by a plate recess (45) extending from a face located adjacent the body (12) to a face carrying grips (60) for grasping a neck of the jar, the recesses (44,45) being in extension of one another and that the device has a second motor (13) rotating the plate (11) about an axis aligned with the plate recess and a valve (46) permitting the opening and closing of the plate recess (45).

2. Device according to claim 1, characterized in that the chute is installed on the body by means of a vibrator system (38).

3. Device according to claim 1, characterized in that the grips (60) are installed on pivots (57), the pivots having rollers (62,63,76), the rollers being actuated by cams (65, 66,77) disposed on a ring (53), the ring rotating in the plate (11) under the effect of a third motor (52), the grips having a retracted position and a convergence position, where the jar (1) is retained on the device, and the grips having a lowered position corresponding to the retracted position and a locking position corresponding to the convergence position where the jar is raised and pressed against the plate around the plate recess (45).

4. Device according to claim 3, further comprising a locking system for the ring, the locking system having a movable rod (72), the rod having a fork (71), the fork adapted to immobilize a projection (70) disposed on the ring (53).

5. Device according to claim 3, wherein jar centering studs (92) are arranged around the plate recess (45) and the grips (60) touch the studs (92) when the grips are in the convergence position.

6. Device according to claim 1, characterized in that the chute has a valve (39) at the end thereof and a jamming sensor (40,41).

7. Device according to claim 1, characterized in that the plate recess (45) is extended by a tube (29) traversing the recess (44) of the body (12) and issuing into the chute (16).

8. Device according to claim 1, characterized in that the body is mounted on a lift chassis (8).

9. Device according to claim 1, wherein the body has an outer shaft (25) and an inner shaft (28), the shafts being connected by bearing blocks (27), the plate (11) being mounted on the internal shaft, the internal shaft and plate being rotatable with respect to the outer shaft.

10. Device according to claim 9, wherein the internal shaft (28) contains a tube (29) traversing said internal shaft and extending from the plate (11) to the chute (16).

* * * * *